Nov. 18, 1969     C. R. VAN NIEL     3,478,801

FASTENING DEVICE

Filed Feb. 27, 1968     2 Sheets-Sheet 1

INVENTOR.
CLARENCE R. VAN NIEL
BY
Teare, Teare & Sammon
ATTORNEYS

Nov. 18, 1969     C. R. VAN NIEL     3,478,801

FASTENING DEVICE

Filed Feb. 27, 1968     2 Sheets-Sheet 2

INVENTOR.
CLARENCE R. VAN NIEL
BY
Teare, Teare & Sammon
ATTORNEYS

United States Patent Office 3,478,801
Patented Nov. 18, 1969

3,478,801
FASTENING DEVICE
Clarence R. Van Niel, North Olmsted, Ohio, assignor to Tinnerman Products, Inc., Cleveland, Ohio, a corporation of Ohio
Filed Feb. 27, 1968, Ser. No. 708,650
Int. Cl. F16b 39/00
U.S. Cl. 151—41.75                         14 Claims

ABSTRACT OF THE DISCLOSURE

A fastening assembly device including a polymeric support-like fastener member having a pair of resilient legs for receiving therebetween an apertured support panel. One of the legs having a window-like opening and attachment device for attachably supporting a resilient metallic insert-like retainer member in pivotal cantilevered bridging relation in the window-like opening for clamping engagement with the support panel. The retainer member includes a thread-engaging aperture for receiving a threaded element for securement of the fastener member via the retainer member to the support panel.

BACKGROUND OF THE INVENTION

This invention relates to fastening devices, and more particularly relates to a fastening assembly device for securement with an apertured support panel by means of a threaded element, such as a screw or the like.

Heretofore, it has been known to provide various types of metallic or plastic type fasteners in conjunction with a connector element, such as a screw, stud or the like, for securement with a support panel, molding or the like. However, such prior devices have generally been of a unitary, one-piece construction whether made either of metallic or plastic materials. Consequently, with such devices it has heretofore been necessary to stock relatively large selections of fasteners in order to accommodate a relatively large number of screw sizes of varying diameter. Similarly, with such devices it has been necessary to additionally stock considerable numbers of fasteners in order to accommodate a relatively wide variety of panels of varying thickness. These requirements are not only uneconomical, but are not an efficient mode of installation for many applications. In addition, such prior devices have not been entirely satisfactory in providing a positive securement with the panel, particularly in installations where appreciable tolerance variations prevail between the parts. Furthermore, such prior devices have not been readily susceptible of imparting a locking drag action on the screw in certain applications, particularly where a wide range of screw and/or panel size is desirable.

SUMMARY OF THE INVENTION

A fastening device for securement with an apertured support panel comprising a polymeric support-like fastener device having a pair of resilient legs extending from a bight portion adapted for receiving said support panel therebetween. One of the legs having a window-like opening and an attachment means adapted for attachably mounting a resilient insert-like retainer member in pivotal cantilevered bridging relation in said window-like opening adapted for clamping engagement with said support panel, and said retainer member having an apertured thread-engaging means adapted for threading engagement with a threaded element for securement of the fastener device via said retainer member to said support panel. In one form, the other leg of said fastener device includes an aperture means for self-threading coacting engagement with said threaded member adapted to impart a drag action on said threaded member upon insertion therethrough and into threaded engagement with the threaded-engaging means on said first mentioned leg.

In the present invention, there is provided a novel fastening device which is economical to produce and which can be readily assembled and disassembled with a minimum of time and effort. The device has a wide range of application and will accommodate a wide range of panel and/or screw sizes without the requirement for stocking a large number of parts. The device provides a positive clamping action on the support panel, and in some applications imparts a locking drag action on the screw to provide a tight clamping connection with the support panel.

DESCRIPTION OF THE PREFERRED EMBODIMENTS

Figure 1:
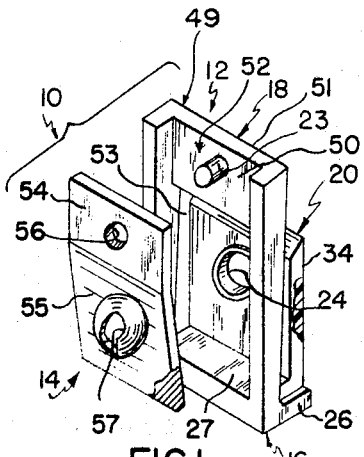
FIG. 1 is a generally perspective view, partially cut away, showing the fastener support member and the insert-like retainer member in the juxtaposed position ready for assembly.

In general, the fastener assembly device of the present invention is illustrated generally at 10 and includes a fastener support member 12 and an insert-like retainer member 14 adapted for attachable pivotal mounting on the fastener member 12. As shown in FIG. 1, the fastener member 12 comprises a pair of spaced resilient legs 18 and 20 adapted to receive an apertured support member P, such as a panel therebetween. The legs 18 and 20 are made integral with and extend outwardly from a bight portion 16. One of the legs, such as 18, includes an attachment means 22 (FIG. 2) disposed adjacent one end for attachable mounting of the retainer member 14 thereon. The retainer member 14 is movably attached via the attachment means 22 so that its opposite end is free to pivot in cantilevered spring-like relation for clamping and locking engagement with the support panel P. The other leg, such as 20, may be provided with an aperture 24 which is adapted to receive a connector element S, such as a threaded screw therethrough. The retainer member 14 further includes a thread engaging aperture 57 so that upon insertion of the connector element S through the aperture 24 and an aperture 61 in the panel P, the connector element will be threaded through the aperture 57 for drawing the legs 18 ad 20 via the retainer member 14 into tight clamping engagement with the support panel P.

Figure 3:
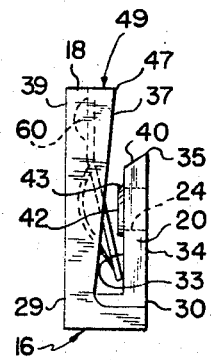
FIG. 3 is a side elevation view of the fastening device assembly shown in FIG. 2.
Figure 4:
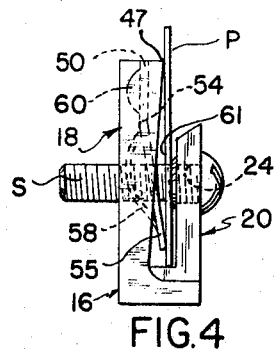
FIG. 4 is a side elevation view showing the fastening assembly device mounted on an apertured support member by means of a threaded member, such as a screw.
Figure 5:
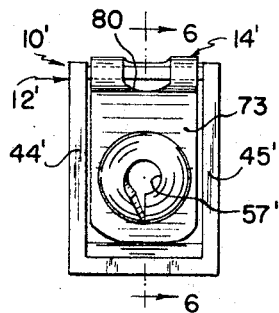
FIG. 5 shows a modification of the insert-like retainer member attachably mounted on the fastener support member.

As shown in FIGS. 1 and 3, the support-like fastener member 12 comprises a pair of laterally spaced, elongated resilient legs 18 and 20 which are integrally connected at one end by a bight portion 16. The legs 18 and 20 extend in the same general direction from the bight portion 16 to provide the generally U-shaped configuration shown. In the form shown, the lower leg 20 is foreshortened with respect to the upper leg 18. It is to be understood, however, that the legs could be substantially coextensive in length, as desired. In the invention, the fastener member 12 is preferably comprised of a resilient polymeric material, such as nylon or the like, so as to impart flexibility to the legs 18 and 20 about the pivotal connection with the bight portion 16.

Figure 2:
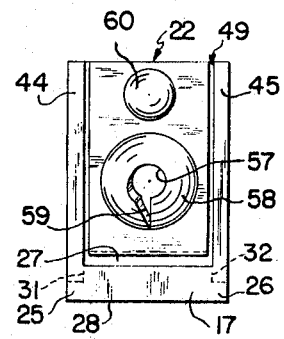
FIG. 2 is a front elevation view of the arrangement shown in FIG. 1, but in the assembled position.

In the form shown, the bight portion 16 includes a base 17 having a pair of recesses defining integral flanges 25 and 26 on opposite sides of the connection of the base 17 with the lower leg 20. As seen in FIGS. 2 and 3, the base 17 includes an inner 27 and outer 28 surfaces, upper 29 and lower 30 surfaces, and oppositely disposed side surfaces 31 and 32, respectively. The recesses or flanges 25 and 26 project outwardly of the side surfaces 31 and 32 adjacent the lower surface 30 to give the bight portion 16 a generally step-like configuration and elevation.

The lower leg 20 is made integral with and extends generally at a right angle from the inner surface 27 of the bight portion 16 and includes generally parallel upper 33 and lower 34 surfaces, respectively. The outer terminal end 35 of the leg may be inclined, as at 40, to provide a cam-like surface to facilitate insertion of the panel P between the legs 18 and 20.

The aperture 24 in the lower leg 20 is preferably circular in shape having a diameter which is preferably larger or equal to the maximum transverse dimension of the screw S. An endless flange 42 may be disposed adjacent the upper surface 33 and around the periphery of the aperture 24 to increase the thread-engaging surface area of the aperture. As shown in FIG. 3, the flange 42 includes a beveled portion 43 which is inclined upwardly and inwardly in a direction toward the bight portion 16 to facilitate insertion of the panel P between the legs 18 and 20. In some instances, the aperture 24 is preferably of a diameter which is smaller than that of the screw S to provide a "drag fit" on the screw, as will hereinafter be more fully described.

The upper leg 18 includes a pair of laterally spaced, elongated arms 44 and 45 (FIG. 2) which extend outwardly and generally parallel to one another from the bight portion 16. Each arm preferably includes an inclined lower surface 37 which extends outwardly and downwardly toward the lower leg 20 in a direction away from the bight portion 16 and an upper surface 39 which extends generally parallel to the general plane of the lower leg 20. By this arrangement, the arms 44 and 45 are wider at their ends remote from the bight portion 16 to provide a cam-like terminal end edge, as at 47, to maximize the gripping action on the panel P in the installed position thereof.

In the invention, an attachment means 22 connects the arms 44 and 45 together at their ends remote from the bight portion 16 and provides attachable connection for mounting the retainer member 14. In the form shown, the attachment means 22 preferably includes a transverse, generally flat cross-piece or bridge member 49 which is made integral with and extends between the arms 44 and 45. The bridge member 49 includes an upper surface 50 which extends generally parallel to and below the upper surfaces 39 of the arms and a lower surface 51 which is disposed in the same general plane as the lower arm surface 37. By this arrangement, a recess-like seat 52 is defined between the arms 44 and 45 and the confronting upper surface 50 to receive one end of the retainer member 14 in the installed position thereof.

As best seen in FIGS. 1 and 3, the bridge member 49 has a widthwise dimension so as to terminate approximately adjacent the terminal end edge 35 of the lower leg 20 so as to define with the bight portion 16 and the arms 44 and 45 a polygonal, window-like opening 53. The opening 53 is adapted to receive the free end of the retainer member 14 is pivotal cantilevered relation, as will be described hereinafter.

In this form, the attachment means 22 may further include an upstanding cylindrical pin 23 which is disposed centrally of the bridge member 49. The pin 23 is preferably made of a polymeric material which may be formed at one end, such as by peening or the like, for rivet-like attachment with the retainer member 14.

The retainer member 14 (FIG. 1) in the embodiment shown is preferably of a unitary, one-piece construction made from a resilient material, such as spring steel or the like. As shown such member preferably includes a body having a generally biplanar construction including a generally flat section 54 which extends generally parallel to the upper surface 50 of the bridge member 49 when in the installed position, and an integral inclined section 55 which extends downwardly and inwardly in a direction toward the bight portion 16 when in the installed position thereof. The overall length of the retainer member 14 is approximately coextensive in length with the arms 44 and 45 of the fastener member 12 and has a width slightly less than the transverse distance between the arms 44 and 45 for insertion through the window-like opening 53.

The end section 54 is provided, in the form shown, with a generally centrally disposed aperture 56 adapted to receive therethrough the upstanding pin 23 for attachment of the retainer member 14 on the bridge member 49. The inclined section 55 may include a thread engaging aperture 57 defined by a generally helical flange 58 which is inclined so as to correspond to the inclination of the threads on the screw S. The flange 58 may be radially split, as at 59, to provide a resilient thread engagement for accommodating the screws of varying diameter, as desired. Accordingly, when the aperture 24 in the lower leg 20 has a lesser diameter than that of the screw, a drag action is imparted to the screw when the latter is inserted therethrough and turned in threading engagement through the thread-engaging aperture 57 in the retainer member. Such drag action is desirable in certain applications.

In a typical application of the assembly device illustrated in FIGS. 1 to 4, the retainer member 14 may be initially attached to the fastener member 12 by positioning the retainer member 14 between the arms 44 and 45 so that the pin 23 is received through the aperture 56, whereupon, the head end of the pin may then be peened over, such as by heat and/or pressure, as at 60. By this arrangement, the retainer member 14 is fixedly attached at one end to the bridge member 49 with its opposite end free for pivotal movement in cantilevered relation in a generally vertical plane through the window-like opening 53 in the upper arm 18. Thus assembled, the device 10 may then be inserted over the marginal edge of the panel P (FIG. 4) to bring the aperture 61 therein into aligned registration withthe apertures 24 and 57 in the leg 20 and the retainer member 14, respectively. During this operation, the leading edge of the panel P is generally cammed between the lower edge 47 of the leg 18 and the inclined surface 40 of the lower leg 20 and acts to resiliently bias the retainer member 14 via its inclined section 55 upwardly away from the leg 20 so as to accommodate thereunder the full thickness of the panel in its final abutted engagement against the bight portion 16. Thus installed, the screw S may then be inserted through the aligned apertures 24, 61 and 57 which acts to draw the legs 18 and 20 via the retainer member 14 together and into clamping engagement with opposed sides of the panel. Upon turning movement of the screw through the thread-engaging aperture 57, the free end section 55 of the retainer member is drawn in cantilevered relation downwardly in a spring-like action for tight gripping engagement with the confronting surface of the panel.

Figure 7:
FIG. 7 is an enlarged fragmentary view showing one form of the attachment means on the fastener support member.

In FIGS. 7 to 12 there are illustrated other forms of the attachment means 22 which may be used in conjunction with the assembly described in connection with FIGS. 1 to 4. In FIG. 7, the pin 23a is generally identical to that previously described, except that the retainer member 14a (FIG. 8) includes a plurality of radially extending slits 62 which define a corresponding number of tabs 63 which define the aperture 56a. In this form, the diameter of the aperture 56a may be less than the diameter of the pin 23a to provide a push-on construction wherein the tabs 63 are deformed outwardly upon insertion of the pin 23a through the aperture.

Figure 9:
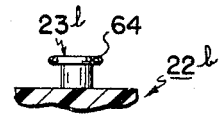
FIG. 9 is an enlarged fragmentary view showing a modified form of the attachment means on the fastener member.
Figure 10:
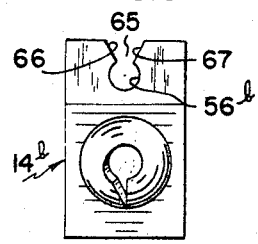
FIG. 10 is a top plan view of another modified form of the insert-like retainer member for attachable connection with the attachment means shown in FIG. 9.
Figure 8:
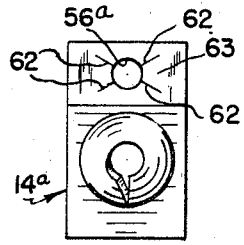
FIG. 8 is a top plan view of a modified form of the insert-like retainer member for detachable connection with the attachment means shown in FIG. 7.

In FIGS. 9 and 10 there is shown another form of the attachment means 22b, wherein the pin 23b includes a head 64 which is of a generally circular and flat construction. In this form, the retainer member 14b may be provided with a generally key-hole shaped slot which extends inwardly from one end thereof and which is defined by a pair of inwardly convergent side edges 66 and 67 which open on to a generally circular aperture 56b. This arrangement provides a generally slip-on construction wherein the pin 23b, may be inserted between the side edges 66 and 67 to resiliently force the same apart until the pin is seated within the aperture 56b.

Figure 11:
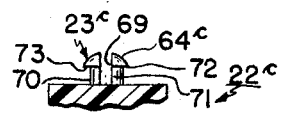
FIG. 11 is an enlarged fragmentary view showing a further modification of the attachment means on the fastener device.
Figure 12:
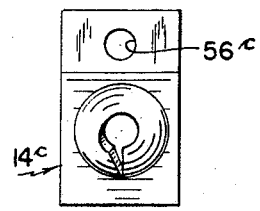
FIG. 12 is a top plan view of another modification of the insert-like retainer member for attachable connection wih the attachment means shown in FIG. 11.

In FIGS. 11 and 12 there is illustrated a further modification of the attachment means 22c, wherein the pin 23c is of a split-post construction including a generally axially extending slot 69 defined by a pair of spaced, resilient legs 70 and 71. In this form, the retainer member 14c is generally identical with that described in connection with FIGS. 1 to 4, having a generally circular aperture 56c for receiving the split pin 23c therethrough. Accordingly, in this form, the head 64c is generally rounded with the width of the slot 69 preferably being less than the diameter of the aperture 56c, and with the overall diameter of the legs 71 and 72, which legs are separated by slot 69, preferably being less than the diameter of the aperture 56c, and with the overall diameter of the head 64c. By this arrangement, the legs 70 and 71 will be urged toward one another as the split head 64c is forced through the aperture 56c to enable the outer edge, as at 72, of the head to pass through the aperture. Due to the elastic characteristics of the material, the legs 70 and 71 will snap back toward one another as the edge 72 moves out of contact with the material of the retainer member 14c and the undersurface, as at 73, of the head 64c acts to overlap the confronting surface of the retainer member for holding the same in assembled position thereof.

In FIGS. 5 and 6 and 13 to 15 there is illustrated another embodiment of the fastener assembly device, designated generally at 10' which is generally similar in construction and operation to that previously described, except that the fastener member 12' and the retainer member 14' are of a slightly modified construction. As shown, the fastener member includes upper 18' and lower 20' resilient legs which extend outwardly from a bight portion 16'. The leg 18' is similarly formed by a pair of laterally spaced arms 44' and 45' which are connected at their ends by a bridge member 49'. In this form, the lower surfaces 37' of the respective arms extend outwardly and inwardly away from the bight portion 16' toward the lower leg 20' (FIG. 13) and then extend upwardly and outwardly to form an inclined cam-like surface 38 to facilitate insertion of the panel between the legs. The upper surfaces 39', however, are inclined in an upward and outward direction away from the bight portion 16' so that the arms have a progressively wider dimension in a direction away from the bight portion. Here also, the inner surface of the bight portion 16' includes an inclined surface 87 (FIG. 6) which terminates in an edge 74. By this arrangement, the free end of the retainer member 14' may be held in abutted engagement against the surface 87 prior to insertion of the panel between the legs 18' and 20' dependent upon its length. Accordingly, the beveled edge 87 provides a cam-like surface to accommodate retainer members of varying thickness, as desired.

Figure 6:
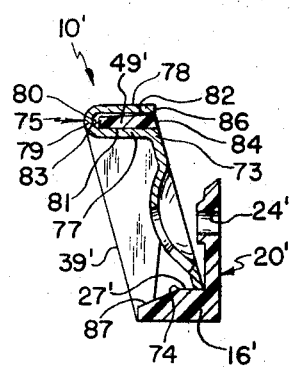
FIG. 6 is a vertical section view taken along the line 6—6 of FIG. 5.

The bridge member 49' in this form extends generally parallel to the bight portion 16' and transversely between the arms 44' and 45', but has its general plane disposed substantially in a right angle with respect to the general plane of the arms. As shown in FIG. 6, the bridge member includes generally flat side surfaces 81 and 82, a generally flat upper end surface 83 and an inclined lower end surface 84 which is generally co-planar with the inclined undersurfaces 38 of the arms. The outer side surface 82 is preferably off-set inwardly of the terminal ends of the arms 44' and 45' to provide a generally recess-like construction for receiving the clip-like attachment end of the retainer member 14'.

In this form, the retainer member 14' is of a generally L-shaped construction including a generally flat base 73 and an integral clip-like attachment end 75. The clip-like end 75 is of a generally U-shaped configuration defined by a pair of spaced, oppositely disposed resilient arms 77 and 78 which are attached together at one end by a curved bight portion 79. The outer arm 78 has a terminal end edge 86 which terminates generally adjacent an imaginary extension of the base 73. The arms 77 and 78 are spaced apart a distance so as to slidably receive and frictionally hold the bridge member 49' therebetween. As best seen in FIG. 6, the base 73 extends generally obliquely outwardly and downwardly from the clip-like end 75 so as to be disposed in generally parallel relation with respect to the upper surfaces 39' of the respective arms 44' and 45' in the assembled position of the device.

In the form shown, the clip end portion 75 may be of a solid or cut-out construction. As shown, the arms 77 and 78 and the bight portion 79 may be cut-out to provide an elongated slot 80 (FIG. 5) so as to enhance the resilient characteristics of the retainer member. The slot 80 may terminate at one end on the arm 78 in a curved end 99 (FIG. 15) for the purpose as will be described hereinafter.

Figure 13:
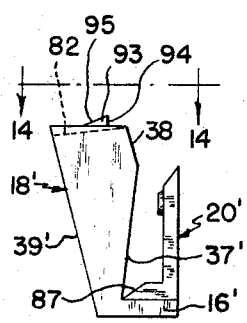
FIG. 13 is a side elevation view showing another modified form of the fastener support member of the invention.
Figure 14:
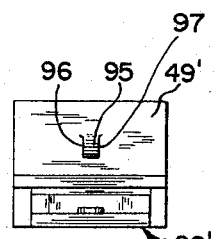
FIG. 14 is a top plan view of the fastener support member shown in FIG. 13.
Figure 15:
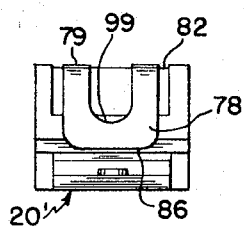
FIG. 15 is a top plan view of the fastener assembly device shown in FIG. 5.

As best seen in FIGS. 13 to 15, the bridge member 49' may be provided with a protuberance or projection 93 adapted for interlocking engagement with the curved end 99 of the slot 80 in the retainer member 14'. As shown, the projection 93 is generally of a triangular shape, in side elevation, including a planar under abutment surface 94 and an inclined outer surface 95 which merges into the outer surface 82 of the bridge member 49'. As seen in FIG. 14, the projection further includes a pair of oppositely disposed side surfaces 96 and 97 which are spaced apart a distance less than the width of the slot 80.

In this embodiment, the retainer member 14' is installed by inserting the arms 77 and 78 over the bridge member 49' which causes the leading end edge 86 of the leg 78 to cam over the inclined surface 95 until the slot 80 is registered over the projection 93, whereupon, the curved end 99 will snap under the abutment surface 94 of the projection for securely mounting the retainer member on the fastener member 12'. Thus installed, the installation with the panel is generally identical to that described in connection with FIGS. 1 to 4 hereof.

In the foregoing embodiments, though the fastening assembly device has been illustrated for use with a single panel, it is to be understood that the device is preferably used for mounting more than one, such as two, panels together. Accordingly, the device 10 could first be applied to one panel and a second panel then attached, or the device could be slipped over both panels with the same disposed between the legs, such as 18 and 20. In addition, it will be seen that the flange 42 not only serves to increase the thread engaging area of the aperture 24, but also preferably acts as a pilot-like guide to engage a marginal portion of the opening 61 in the panel P to retain the device in the attached position thereon. Moreover, the fastener member 12 could also be made without the flange 42 which would result in the fastener being returned on the panel by the clamping force exerted by the legs, such as 18 and 20, and the inclined section 55 of the retainer member 14, as desired.

What is claimed is:
1. A fastening device comprising,
a fastener-like support member and a separate insert-like retainer member adapted for attachable mounting on said support member,
said support member including a pair of spaced legs joined together at one end by a bight portion and being adapted to receive an apertured support panel therebetween,
one of said legs having an enlarged opening therein,
said leg including a pair of laterally spaced arms extending outwardly from said bight portion,
an attachment means joining said arms together at their ends remote from said bight portion and together therewith defining said opening,
said retainer member being attachably connected at one end to said attachment means,
the opposite end of said retainer member projecting in a direction towards said bight portion and being attached for pivotal movement about said connected end, and
said opposite end of said retainer member having transverse dimensions less than the corresponding transverse dimension of said opening thereby said opposite end of said retainer is free to pivot within said opening for resilient clamping engagement with said support panel.

2. A fastening device comprising,
a fastener-like support member and insert-like retainer member adapted for attachable mounting on said support member,
said support member including a pair of spaced legs adapted to receive an apertured support panel therebetween,
one of said legs having an enlarged opening therein,
attachment means disposed adjacent said opening adapted for operably connecting one end of said retainer member to said leg for pivotal movement of said retainer member in a direction toward its outer end in said opening for clamping engagement with said support panel,
the opening in said leg is defined by a pair of laterally spaced arms extending outwardly from a bight portion and said arms being joined together at their opposed ends by a bridge member,
said attachment means includes an upstanding pin projecting outwardly from said bridge member adapted to be received through an aperture means in said retainer member,
said pin includes a head, and
said aperture means including a generally key-hole shaped slot adapted to slidably receive said pin for overlapping engagement of said head with the confronting surface of said retainer member.

3. A fastening device comprising,
a fastener-like support member and insert-like retainer member adapted for attachable mounting on said support member,
said support member including a pair of spaced legs adapted to receive an apertured support panel therebetween,
one of said legs having an enlarged opening therein,
attachment means disposed adjacent said opening adapted for operably connecting one end of said retainer member to said leg for pivotal movement of said retainer member in a direction toward its outer end in said opening for clamping engagement with said support panel,
the opening in said leg is defined by a pair of laterally spaced arms extending outwardly from a bight portion and said arms being joined together at their opposed ends by a bridge member,
said attachment means includes an upstanding pin projecting outwardly from said bridge member adapted to be received through an aperture means in said retainer member,
said pin is of a split construction including a split head adapted to be forcibly inserted through said aperture means for overlapping engagement of said head with the confronting surface of said retainer member,
said aperture means including a generally key-hole shaped slot adapted to slidably receive said pin for overlapping engagement of said head with the confronting surface of said retainer member.

4. A fastening device comprising,
a fastener-like support member and insert-like retainer member adapted for attachable mounting on said support member,
said support member including a pair of spaced legs adapted to receive an apertured support panel therebetween,
one of said legs having an enlarged opening therein,
attachment means disposed adjacent said opening adapted for operably connecting one end of said retainer member to said leg for pivotal movement of said retainer member in a direction toward its other end in said opening for clamping engagement with said support panel,
said retainer member is made from a resilient material including a base and a generally U-shaped clip portion extending upwardly adjacent one end of said base,
said clip portion being adapted for interlocking engagement with said attachment means, and
thread-engaging means extending through said base adapted for receiving a threaded member.

5. A fastening device in accordance with claim 4, wherein
said legs extend outwardly from a bight portion and are joined together at their opposed ends by a bridge member, and
said clip portion adapted for snap-action interlocking engagement over said bridge member for holding said retainer member in supported and cantilevered relation for resilient pivotal movement in said opening.

6. A fastening device comprising,
a fastener-like support member and a separate insert-like retainer member adapted for attachable mounting on said support member,
said support member including a pair of spaced legs integrally joined together at one end by a bight portion and adapted to receive an apertured support panel therebetween,
one of said legs having an enlarged opening therein,
said opening being defined by a pair of laterally spaced arms extending outwardly from said bight portion and joined together at their opposed ends by an attachment means,
said legs extending outwardly and generally convergently toward one another in a direction away from said bight portion, said attachment means including a bridge member extending between and joining the ends of said arms remote from said bight portion, a projection extending outwardly from said bridge portion and detachably mounting one end of said retainer member, the opposite end of said retainer member extending in a direction toward said bight portion, and said opposite end of said retainer member having transverse dimensions less than the corresponding transverse dimensions of said opening to enable said opposite end to pivot within said opening for resilient clamping engagement with said support panel for engagement with the other of said legs generally adjacent its juncture with said bight portion.

7. A fastening device in accordance with claim 6, wherein
said retainer member includes a thread-engaging means adapted for receiving a threaded member.

8. A fastening device in accordance with claim 6, wherein
the other leg of said support member includes an aperture means adapted for receiving said threaded member upon threading engagement through said thread-engaging means.

9. A fastening device in accordance with claim 6, wherein
said bridge member extends transversely between and inwardly of said arms to provide a recess-like seat adapted to hold said retainer member in supported and cantilevered relation for pivotal movement in said opening.

10. A fastening device in accordance with claim 6, wherein
said retainer member is made from a resilient material having a generally bi-planar body,
thread-engaging means disposed in said body adapted for receiving a threaded member, and
aperture means extending through said body adapted for operable connection with said attachment means.

11. A fastening device in accordance with claim 6, wherein
said fastener support member is made from a polymeric material, and wherein said retainer member is made from a resilient metallic material.

12. A fastening device in accordance with claim 6, wherein
said projection comprises an upstanding pin member projecting outwardly from said bridge member adapted to be received through an aperture means in said retainer member.

13. A fastening device in accordance with claim 6, wherein
the under surfaces of said arms are inclined downwardly and outwardly in a direction away from said bight portion.

14. A fastening device in accordance with claim 13, wherein
said other leg is disposed generally perpendicular with respect to said bight portion so that the undersurfaces of said arms and the other of said legs extend generally convergently toward one another in a direction away from said bight portion.

References Cited

UNITED STATES PATENTS

| | | | |
|---|---|---|---|
| 2,115,312 | 4/1938 | Lombard | 151—41.75 |
| 2,159,573 | 5/1939 | Tinnerman | 151—41.75 |
| 2,394,729 | 2/1946 | Tinnerman | 151—41.75 |
| 3,009,499 | 11/1961 | Weihe | 151—41.75 |
| 3,116,776 | 1/1964 | Flora | 151—41.75 |
| 3,285,560 | 11/1966 | Pistey | 151—41.75 |
| 3,358,729 | 12/1967 | Munse | 151—41.75 |
| 3,362,278 | 1/1968 | Munse. | |

FOREIGN PATENTS

| | | |
|---|---|---|
| 278,675 | 10/1964 | Australia. |
| 1,059,722 | 6/1959 | Germany. |

MARION PARSONS, Jr., Primary Examiner